May 25, 1948.　　　　　J. L. BOYER　　　　　2,442,260
POLYPHASE ELECTRONIC CONVERTER
Filed April 5, 1947　　　　2 Sheets-Sheet 1

WITNESSES:
Edward Michaels

INVENTOR
John L. Boyer.
BY O. B. Buchanan
ATTORNEY

May 25, 1948.   J. L. BOYER   2,442,260
POLYPHASE ELECTRONIC CONVERTER
Filed April 5, 1947    2 Sheets-Sheet 2

WITNESSES:
Edward Michaels
Wu. C. Groove

INVENTOR
John L. Boyer.
BY O. B. Buchanan
ATTORNEY

Patented May 25, 1948

2,442,260

UNITED STATES PATENT OFFICE 2,442,260

POLYPHASE ELECTRONIC CONVERTER

John L. Boyer, Wilkinsburg, Pa., assignor to Westinghouse Electric Corporation, East Pittsburgh, Pa., a corporation of Pennsylvania Application April 5, 1947, Serial No. 739,722

9 Claims. (Cl. 172—281)

My invention relates to rectifier and inverter converters consisting of a plurality of groups of specially-controlled tubes, and tube-circuits therefor. While certain features of my invention are of more general application, my invention was designed particularly for an electronic frequency-changer known as a cycloconverter, and it was still more particularly designed for supplying power from a higher-frequency input-circuit, generally of a constant frequency, and generally polyphase, to a lower-frequency load-circuit which may be either single-phase or polyphase, and which may or may not have a variable frequency. The direction of the power-flow may also be reversed. A cycloconverter comprises two groups of tubes for each phase of the output-frequency, and both groups of tubes are so controlled that they are capable of acting alternately as rectifiers and inverters, thus going through cycles of rectification and inversion, hence the name "cycloconverter."

The tubes are preferably either hot-cathode gas-filled tubes, or ignitrons, or other tubes having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode; the tube, when fired, having a tendency to remain conducting, independent of the control-element, until the anode becomes less positive than the cathode. The control-element may be a control-grid or, in the case of an ignitron, the control-element may be either a control-grid or an ignitor.

An important field of application of cycloconverters is its use as an electronic means for driving a polyphase motor at a variable frequency from a constant-frequency source. Cycloconverters achieve such an object with high efficiency.

Some of the previously known cycloconverter circuits, for such purposes, have involved disadvantages which have been introduced by the necessity for adding reactance, in the circuit, to limit the fault-current to a magnitude which can be controlled by the tubes, in the event of a failure on one of the tubes. Such a tube-failure frequently has interposed a short-circuit on either the input-circuit or the output-circuit of the converter, and the added reactance has been necessary, in order to limit this short-circuit current to a value which the sound tube, in the short-circuit path, will be able to interrupt or commutate, at the end of its conducting period. Heretofore, however, the short-circuit current-limiting reactance, which has been introduced, has always had the disadvantage that the voltage-regulation of the converter has been changed for the worse, resulting in a larger drop in the output-voltage, as the load is changed from zero to the maximum load.

It is an object of my present invention to provide an improved electronic frequency-changer circuit in which the voltage-regulation of the output-circuit is not substantially changed by the reactance which is introduced for the purpose of limiting the value of the internal short-circuit current.

A more specific object of my invention is to provide an electronic frequency-changing converter in which the power-transfer connection between the converter-tubes and the output or load-circuit is attained by means of polyphase reactors in which the normal load-currents of the several output-phases oppose each other, at any instant, so that substantially no reactance voltage-drop is produced in the output-circuit, whereas, in the event of an internal short-circuit, the reactor-currents are not balanced, thus causing the reactor to impose as high a reactance as may be desired, so as to limit the short-circuit currents to a value which can be easily controlled or cleared by the converter tubes.

These polyphase reactors also serve to substantially minimize the circulating currents which flow between the positive and negative voltage-producing groups of each pair of groups of converted tubes, because the short-circuit current-limiting value of the several reactances is also available to limit the amount of circulating current which flows as a result of the inevitable differences between the two paralleled converter-groups, that is, the positive and negative voltage-producing groups of each pair of groups, during the moments when the voltages impressed upon the two groups are not exactly equal.

With the foregoing and other objects in view, my invention consists in the circuits, systems, combinations, apparatus, parts and methods hereinafter described and claim, and illustrated in the accompanying drawings, wherein:

Figure 1:
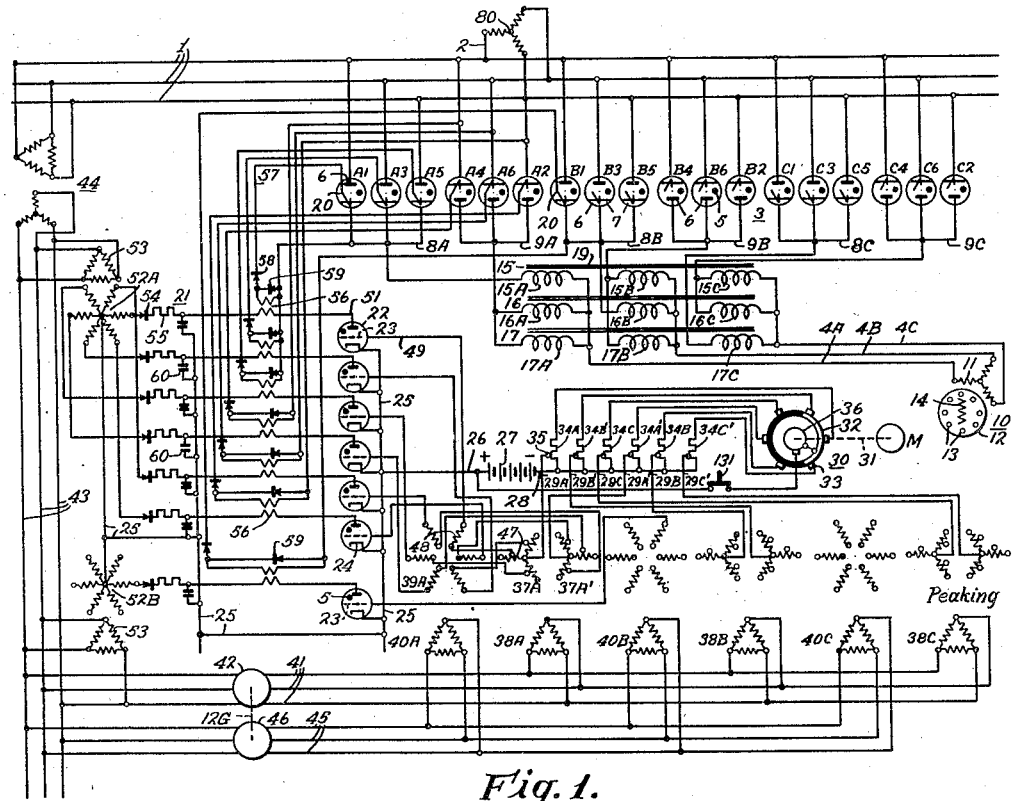
Figure 1 is a simplified diagrammatic view of circuits and apparatus illustrative of a three-phase cycloconverter for supplying a three-phase output-circuit.

In Fig. 1, I show a 3-phase input-circuit 1, which is energized from a generator 2. An eighteen-tube cycloconverter 3 is utilized to couple the input-circuit 1 to a 3-phase output-circuit 4A, 4B and 4C, having a frequency lower than the input-circuit.

The supply-circuit 1 may be a constant-frequency 60-cycle system, or any other alternating-current supply-system, usually polyphase, while the output-circuit 4A, 4B, 4C may either be of a constant frequency, such as a 25-cycle system, or it may be of a variable frequency, which may be controlled.

While I refer to the supply and load circuits 1 and 4A, etc., as input and output circuits, respectively, I wish it to be understood that the direction of power flow is reversible, so that power may be interchanged in either direction between these two circuits, the words "input" and "output" being utilized merely as a matter of convenience, to refer to circuits which ordinarily serve as the input and output circuits, respectively, in most applications of the invention.

Each of the main power-tubes 3 may be either a hot-cathode gas-filled tube or an ignitron, having a suitable control-electrode. In the drawing, a tiny circle or dot 5 has been placed within the diagrammatic representation of each of these tubes, as a convention for indicating the presence of gas or vapor, or other means for causing the control-electrode of the tube to become ineffective, in general, to stop the firing of the tube, once the firing has been initiated.

The main anode-cathode circuits of the cycloconverter-tubes may be arranged or connected in any of the ways known for rectifiers and inverters, either single-phase or polyphase, and for any desired number of phases. In the form of embodiment of my invention which is shown in Fig. 1, the cycloconverter-tubes 3 are arranged in six groups numbered A1, A3, A5; A4, A6, A2; B1, B3, B5; B4, B6, B2; C1, C3, C5; and C4, C6, C2. The letters A, B and C of this nomenclature correspond to the three phases of the output-circuits 4A, 4B and 4C. The numbers correspond to the phase numbers of a 6-phase system of vectors of the input-frequency.

The positive groups of cycloconverter tubes 3 are those bearing odd numbers, such as the tubes A1, A3 and A5, for example, which supply the positive half-waves of the phase-A output-current for the output-conductor 4A. These tubes are called the positive tubes because their anodes 6 are connected to the respective phase-conductors of the three-phase input-circuit 1. The mercury cathodes 7 of these positive tubes are connected to a common cathode-circuit 8A. The corresponding cathode-circuits for the other output-phases are designated 8B and 8C, respectively.

The so-called negative tubes 3 of the cycloconverter are designated by even numbers, such as the tubes A4, A6 and A2, which supply the negative halves of the output-currents in their respective output-phases, such as the output-phase 4A. The cathodes 7 of each of these negative tubes are connected to the respective phase-conductors of the 3-phase input-circuit 1, while the anodes 6 of said negative tubes are connected to common anode-conductors 9A, 9B and 9C, respectively, for the three output-phases 4A, 4B and 4C.

As will be explained later on, each group of tubes, either positive or negative, is capable of supplying substantially the entire voltage-wave of the output-phase to which it is connected. When the output-current is at unity displacement-factor, the positive half-waves of current are drawn from the positive tubes, through rectifier action, and the negative half-waves of the current are drawn from the negative tubes, also through rectifier action. However, an important characteristic feature of my cycloconverter is that the output-current does not need to be at unity displacement-factor, and when this is the case, the output-current is not in phase with the output-voltage, so that the part of the current which is out of phase with the voltage is supplied partly by rectifier action, and partly by inverter action.

This circumstance will be explained more in detail, with reference to wave-form diagrams, in the subsequent explanation of the mode of operation of the invention. It is mentioned, here, to emphasize the fact that when I refer to positive tubes and negative tubes, I use the terms "positive" and "negative" only as a convenience, to refer to currents which are considered to be positive or negative at any particular moment. It should be borne in mind, however, that each cycloconverter-tube 3 is capable of supplying both the positive and negative halves of the output-voltage wave, by reason of the control-circuit voltage which is supplied to each tube, as each cycloconverter-tube 3 is capable of operating either as a rectifier or as an inverter.

The 3-phase output-circuit 4A, 4B, 4C of Fig. 1 is illustrated as being utilized to energize a variable-speed 3-phase motor 10, which may be either an induction motor or a synchronous motor. It is illustrated as having a 3-phase primary winding 11, which is the stator winding of the machine, and it has a rotor 12 which is provided with a squirrel-cage secondary or damper winding 13, and it may or may not have a direct-current exciting-winding 14, which may be suitably controlled by automatic or manual means (not shown), as is well understood in the art of synchronous-motor operation.

In accordance with my present invention, I provide a novel method and means for transferring power from the six groups of cycloconverter-tubes—that is, from the six output-circuits 8A, 9A, 8B, 9B, 8C and 9C of the several groups—to the several output-phases 4A, 4B and 4C. For this purpose, I utilize three polyphase reactors, 15, 16 and 17, for combining the unidirectional outputs of the six converter-groups, so that a three-phase alternating voltage and current is supplied to the motor 10, at any desired frequency, particularly one which is below the supply-frequency of the input-circuit 1. Each of three reactors 15, 16 and 17 has a single iron core of magnetic circuit 19, and three windings, all having the same number of turns, the three windings being designated by the same number as the reactor of which they form a part, with the letters A, B and C added to distinguish them. Thus, the reactor 15 has the windings 15A, 15B and 15C, all on the same core. The three cores 19 of the three reactors 15, 16 and 17 may be separate cores, or separate legs of a three legged or polyphase core, the operation being exactly the same, in either case.

The electrical connections of the several reactor-windings are as follows.

One winding of each of the reactors 15, 16 and 17 is excited with all of the current of the positive-voltage group which serves one of the output-phases, while the other two windings of that same reactor are each excited with one-half of the current of each of two different negative-voltage groups which serve the other two output-phases respectively. Thus, the output-terminal 8A of the positive-voltage group A1, A3, A5 is connected to the input-terminal of the reactor-coil 15A, and the output-terminal of this coil is connected to the output-circuit conductor 4A. In like manner, the reactor-coil 16B is connected between the output-terminal 8B and the output-circuit phase 4B, while the reactor-coil 17C is similarly connected between the output-terminal 8C and the output-circuit phase 4C. The two coils 16A and 17A are connected, in parallel-circuit relation to each other, between the output-terminal 9A of the negative-voltage group A4, A6, A2, and the output-circuit phase 4A. In like manner, the two coils 15B and 17B are connected, in parallel-circuit relation to each other, between the output-terminal 9B and the output-circuit phase 4B; and the two coils 15C and 16C are connected, in parallel-circuit relation to each other, between the output-terminal 9C and the output-circuit phase 4C.

The polyphase reactors 15, 16 and 17, which have just been described, serve as paralleling reactors for insuring the correct, so-called parallel, operation of the two converter-groups of each pair of groups, with one group supplying the positive halves of the output-voltage and current, while the other group supplies the negative halves. The three paralleling reactors 15, 16 and 17 permit the instantaneous voltages of the output-terminals of the two groups of each pair, for example, the terminals 8A and 9A, to be momentarily different, at any instant—as at the ends of the inverter-operation and the beginnings of the rectifier-operation—while also maintaining such distribution of the load-currents that the total load-currents in all three output-phases tend to add up to zero at any instant.

Each of the nine reactor-coils 15A to 17C thus receives a series of unidirectional impulses of current, of either approximately 180 output-frequency degrees duration, or approximately 120 output-frequency degrees duration, as shown in the various curve-diagrams, Figs. 4A to 6C.

Figure 4A:
Figs. 4A to 6C are curve-diagrams which will be referred to in the explanation of the invention.
Figure 4B:
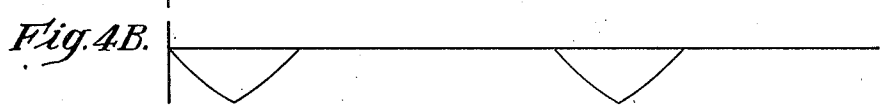
Figure 4C:
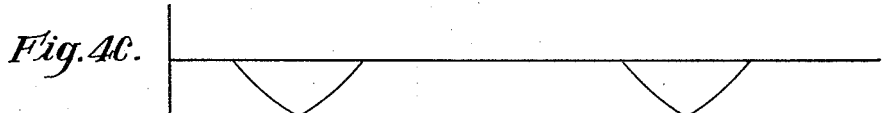
Figure 5A:
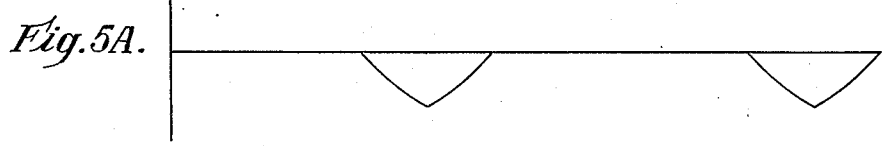
Figure 5B:
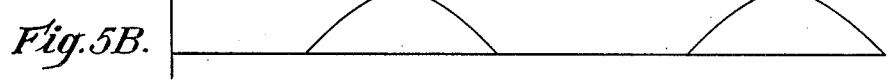
Figure 5C:
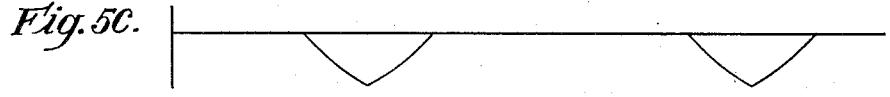

Figs. 4A, 4B and 4C show the currents which flow through the respective coils 15A, 15B and 15C of the first reactor, numbered 15. Figs. 5A, 5B and 5C show the currents traversing the respective coils 16A, 16B and 16C of the second reactor, numbered 16. In like manner, Figs. 6A, 6B and 6C show the currents traversing the respective coils 17A, 17B and 17C of the third reactor, numbered 17.

Figure 6A:
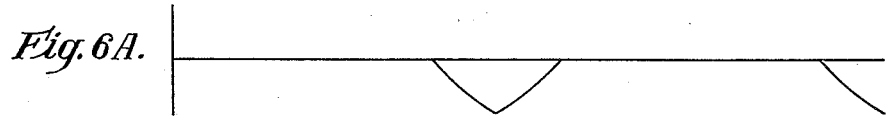
Figure 6B:
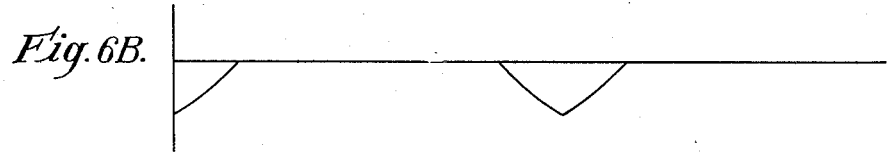
Figure 6C:

It will be noted, from Fig. 1, that the output-circuit phase 4A receives the currents from the reactor-coils 15A, 16A and 17A, that is, the sum of the currents shown in Figs. 4A, 5A and 6A. In like manner, the other two output-phases 4B and 4C receive the total of the currents in the correspondingly lettered figures, 4B, 5B, 6B, and 4C, 5C, 6C, respectively.

Since each reactor, such as the reactor 15, has three coils, such as 15A, 15B, 15C, on the same magnetic circuit, the total of the currents in these three coils adds up substantially to zero, at any instant. This circumstance controls the manner in which the output-currents of the negative-group terminals 9A, 9B and 9C (Fig. 1) divide between the several pairs of coils 16A, 17A; 15B, 17B; 15C, 16C.

Thus, Figs. 4A, 4B and 4C show how the three winding-currents of the reactor 15 add up to zero, at each instant.

Fig. 4A shows the output-current of the positive-group terminal 8A, as a positive half-wave of substantially 180° extent, the illustrated sinusoidal shape being somewhat of an idealization or simplification, as there are usually some harmonics in the wave-form.

Figs. 4B and 4C show how the half-currents of the negative-group output-terminals 9B and 9C, respectively, are shaped so that each half-current, as shown by either Fig. 4B or Fig. 4C, has a cut-off wave-shape of approximately 120° extent, so that the sum of the currents in Figs. 4B and 4C is just equal and opposite to the current in Fig. 4A.

The total of the output-current of each of the negative-group output-terminals, such as the terminal 9A in Fig. 1, is the total of the currents shown in two figures, such as Fig. 5A and Fig. 6A, and it will be seen that the sum of these two currents, when filled in, in Fig. 4A, would complete the lower (or negative) halves of a complete sinusoidal wave, which would represent the current received by the phase 4A of the output-circuit to which the motor 10 is connected.

From the foregoing explanation, it will be apparent that, no matter how large or how small the output-current is, the total of the currents in each one of the three paralleling reactors 15, 16 and 17 is substantially equal to zero, at any instant, so that the paralleling reactors do not interpose any material reactance which is effective in the output-circuit 4A, 4B, 4C. On the other hand, if there should be an internal fault, for instance one involving a direct-current flow from the output-terminal 8A to the output-terminal 9A, these internal-fault currents would not be balanced by currents totaling an equal and opposite magnitude in the other windings of the several reactors, so that the reactors would interpose a high reactive impedance which limits the flow of these internal fault-currents.

By way of completing the circuit-diagram, in Fig. 1, I have shown an illustrative form of a desirable tube-control circuit which is only one of several control-circuits which are available. The particular form of tube-control which is shown in Fig. 1 involves features which constitute the subjects-matter of a Boyer and Hagensick application, Serial No. 739,723, filed April 5, 1947, which is featured by a tube-control circuit including the equivalent of four serially connected grid-voltages, and another Boyer and Hagensick application, Serial No. 739,724, filed April 5, 1947, which is featured by unequal modulator-controlled rectifying and inverting periods, and also by certain desirable single-pole modulator-commutator connections.

In Fig. 1, the cycloconverter-tubes 3 are illustrated as ignitron tubes, and the control-electrodes are illustrated as being the ignitors 20 of the several tubes. The exciting currents for the several ignitors, as illustrated, are supplied by a known form of exciter-circuit, indicated generally by the numeral 21, from eighteen gas-filled auxiliary or exciter-tubes 22, only seven of which are shown in Fig. 1, the rest having been omitted in order to avoid unnecessary complication of the diagram. Thus, I have illustrated the six auxiliary tubes 22 for exciting the ignitors of the six phase-A cycloconverter-tubes A1, A3, A5; A4, A6, A2, referring to the output-phase A of the output-circuit conductor 4A. The cycloconverter-tubes of the remaining two phases are similarly controlled, the nature of the control being indicated only for the first tube, B1, of the second output-phase, to show the nature of the connections.

The ignitor-energizing tubes 22 have control-grids 23 which are controlled in a novel manner. The cathodes 24 of all eighteen exciter-tubes 22 are connected to a common cathode-circuit or bus 25, to which is connected a grid-control circuit 26 which includes a negative bias battery 27, and a conductor 28 which then branches into six branch control-circuits 29A, 29A', 29B, 29B', 29C, and 29C'. One of these branch control-circuits is utilized for the grids 23 of the ignitor-energizing tubes 22 for the three cycloconverter-tubes 3 of each of the six groups of cycloconverter-tubes. The control-circuit branches for the positive cycloconverter-groups are not primed, and control-circuit branches for the negative cycloconverter-groups are primed.

Each of the control-circuit branches 29A, etc., includes a source of a square-topped modulator-wave voltage, phased according to the desired output-phases 4A, 4B and 4C, to supply both the positive and negative halves of the output-phases. As set forth in the joint application Serial No. 739,724, filed April 5, 1947, I utilize a control-circuit including a common cathode-circuit 25—26; and hence, the modulator-wave circuit, for each cycloconverter-group, (such as the tubes A1, A3, A5), may be a single-pole rotating-commutator bias-controlling means.

This single-pole rotating-commutator bias-controlling means may take various forms. In Fig. 1, it comprises a rotating commutator 30, mounted on a shaft 31 which is driven at the synchronous speed corresponding to the desired output-frequency of the output-circuit 4A, 4B, 4C, as by means of a motor M. The commutator 30 has one conducting commutator-segment 32, or one segment for each 360 electrical degrees; and this segment has a circumferential extent which is materially less than 180 electrical degrees, as will be subsequently explained in detail. Bearing on the commutator 30 are six commutator-brushes 33 which are spaced by the number of electrical degrees corresponding to twice the number of phases of the output circuit 4A, 4B, 4C, twice because both positive and negative wave-halves are supplied. In Fig. 1, since the output-circuit is three-phase, there are six commutator-brushes 33, spaced 60 electrical degrees apart.

The six commutator-brushes 33 are serially connected, through resistors 34A, 34A', 34B, 34B', 34C and 34C', respectively, to the negative terminal 28 of the negative-bias battery 27. The resistors 34A, etc., have intermediate potentiometer-taps 35, which are connected to the respective branch-circuits 29A, etc. The commutator-segment 32, is connected, through a slip-ring 36, to the positive terminal 26 of the negative-bias battery 27, so that the six potentiometers 34A, etc., serve to periodically reduce the negative bias which is effective in the respective branch-circuits 29A, etc., at the times when the respective potentiometers are energized by their respective commutator-brushes 33.

Continuing the description of the grid-control branch-circuits 29A, 29A', 29B, 29B', 29C and 29C', as shown in Fig. 1, it will be noted that the two branch-circuits 29A and 29A', for controlling the positive and negative tubes of the output-phase A, are connected to the midpoints of two groups of 3-phase-star-connected secondary windings 37A and 37A', which are energized from a group of 3-phase-connected primary windings 38A of three single-phase peaking transformers, for supplying the grid-controlling voltage-peaks for controlling the rectifier-operation of the corresponding cycloconverter-tubes 3. The corresponding phases of the rectifier-peaker windings 37A and 37A' are connected to the proper phases of a group of open-star 6-phase-connected secondary windings 39A which are excited by a group of 3-phase-connected primary windings 40A of three single-phase peaking transformers for supplying the grid-controlling voltage-peaks for the inverter-operation of the respective cycloconverter-tubes 3.

The corresponding peaking transformers for the output-phase B are indicated at 38B and 40B. The corresponding peaking transformers for the third phase C are indicated at 38C and 40C.

The three groups of "rectifier" peaking transformers 38A, 38B and 38C are illustrated as being excited from a 3-phase input-frequency circuit 41, the phase of which is controlled by means of a phase-shifter 42 which is excited from an auxiliary input-frequency circuit 43, energized, through an auxiliary power-transformer 44, from the 3-phase input-circuit 1 of the cycloconverter. The three groups of "inverter" peaking transformers 40A, etc., are excited from a 3-phase input-frequency circuit 45, which is energized, by a phase-shifter 46, from the auxiliary input-frequency circuit 43.

Each of the six sets of peaking-transformer secondaries, such as 37A and 39A, subdivides its branch control-circuit, such as 29A, into as many separate circuits as the number of main tubes 3 in each cycloconverter-group, such as A1, A3 and A5. Each cycloconverter tube 3 thus receives its proper phase-control, through its assigned firing-controlling tube 22.

Tracing the grid-control circuit for controlling the first cycloconverter-tube A1, for example, and starting with the branch-circuit conductor 29A, it will be noted that the rectifier-peaker winding 47, having a phase corresponding to the voltage-phase which is supplied to the main tube A1, is connected in series with the inverter-peaker phase 48, which preferably lags 120° behind the winding 47, although the relative phases may be controlled, to a nicety, by the respective phase-shifters 42 and 46. The output-terminal of the inverter-peaker phase 48 is connected to the grid-circuit 49 of the auxiliary tube 22 which excites the ignitor 20 of the cycloconverter-tube A1.

Figure 3:
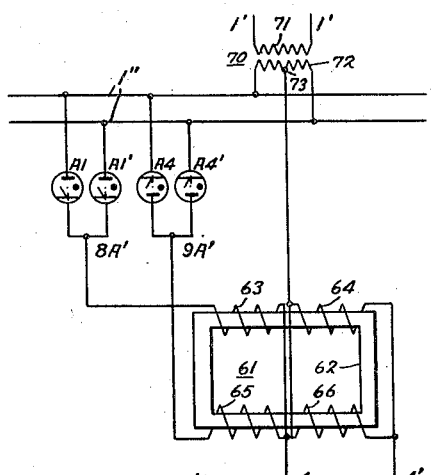

The ignitor-circuits of the cycloconverter-tubes 3 in Fig. 3 are energized from the anode-circuits 51 of the respective auxiliary tubes 22. These anode-circuits are energized from a set of 6-phase star-connected secondary windings 52A, 52B, etc., of exciter-transformers which are illustrated as having 3-phase primary windings 53, energized from the auxiliary input-frequency bus 43.

The anode-circuit 51 of each of the auxiliary tubes 22 includes a rectifier 54 for delivering only the positive half-waves of the energizing-transformer phase, a current-limiting resistor 55, and the primary winding of an insulating transformer 56, the secondary winding of which excites the ignitor-circuit 57, through a rectifier 58 which supplies only the positive peaks to the ignitor. A return-path for the flux-decay current of the insulating transformer 56 is provided, in a known manner, by means of a rectifier 59 which is connected across the transformer-secondary.

The energy-source for each of the anode-circuits 51 of the auxiliary or exciting tubes 22 also includes an energy-storing capacitor 60 which is connected in shunt across the anode-circuit, at a point between the resistor 55 and the insulating transformer 56. The capacitor 60 assists in delivering a strong peak-current to the ignitor-circuit when the auxiliary tube 22 becomes conducting. The current-limiting resistor 55 controls the rate at which the capacitor 60 is charged, during the positive half-cycles of the anode-voltage which is applied to the tube 22, and the resistor 55 also serves to limit the amount of current which is drawn from the transformer-windings 52A, etc., when the auxiliary tube 22 becomes conducting.

The effect of the control-circuits, just described, is to cause the three main tubes 3 of each cycloconverter-group, such as the group A1, A3, A5 in Fig. 1, to deliver the half-way output-current impulses, such as those shown in Fig. 4A, the particular control-circuits being fully claimed in the joint applications previously mentioned.

When the output-circuit of the cycloconverter is utilized to energize a motor 10 which is provided with a damper winding or short-circuited squirrel-cage secondary winding 13, as shown in Fig. 1, experience has shown that the motor is quite capable of performing satisfactorily on an output-wave-form having strong harmonics in it, either when the harmonics result from the blocked or square-topped form of the output-voltage of the cycloconverter, in the output-circuit 4A, 4B, 4C of Fig. 1, or when the harmonics result from ripples which produce harmonics in the output-voltage wave. This is so, because the motor damping-winding 13 substantially blocks the harmonics from the wave-form of the flux of the motor, resulting in only a moderate increase in the heating of the motor because of the harmonics in the voltage which is supplied to the motor.

When the displacement-factor of the load on the output-circuit 4A, 4B, 4C of Fig. 1 is substantially unity, and can be maintained surely at unity, without risk of having any substantial wattless-current component, then it is not necessary for the inverter-controlling peakers to be used in our control-circuits, such as are shown at 40A—39A in Fig. 1, and these inverter-controlling peakers could then be either omitted entirely, or cut out of circuit during the unity-displacement-factor operation. As covered by the joint application, Serial No. 739,723, filed April 5, 1947, the inclusion of these inverter-controlling peakers makes it possible to supply an output-circuit load which is not at unity displacement-factor, either during the motor-starting period, or under fault-conditions, or even during normal operating-conditions.

As covered by the joint application, Serial No. 739,724, filed April 5, 1947, the illustrated control-circuit arrangement makes it readily possible to easily stop rectification in all of the cycloconverter-tubes 3, without removing the inverting firing impulses. This may readily be done by including a rectification-controlling switch 131 in the single-pole modulator-frequency bias-reducing circuit, in Fig. 1, so as to make it impossible for the rotating commutator 30, 30' or 30" to reduce the negative biasing-voltage to the point where the rectification peaks R1, R2, etc., can make the resultant grid-voltage attain the critical firing-value 84. Thus, in Fig. 1, the rectification-controlling switch 131 is connected in series between the positive battery-terminal 26 and the commutator slip-ring 36.

Figure 2:
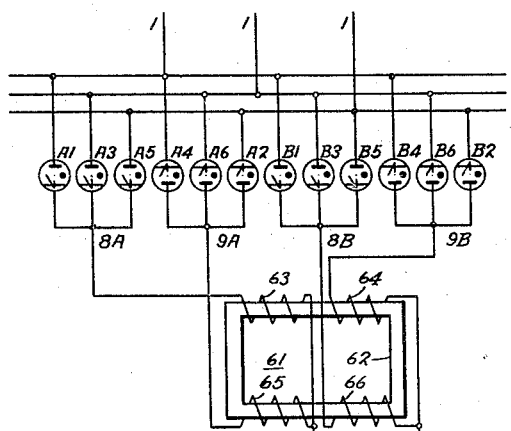
Figs. 2 and 3 are similar simplified views illustrating other forms of embodiment or application of the invention, showing only the main converter-circuits involving the main anode-cathode circuits, and omitting the control-circuits.

Fig. 2 is a simplified diagram of connections, showing the main circuits, but omitting the control-circuits, of an electronic frequency-changer. A three-phase input-circuit 1 is used in Fig. 2, as in Fig. 1, but a single-phase output-circuit 4, 4' is used in Fig. 2, instead of the three-phase output-circuit 4A, 4B, 4C of Fig. 1. In Fig. 2, I utilize only 2 pairs of groups of cycloconverter-tubes 3, having the output-terminals 8A, 9A, 8B and 9B.

The paralleling reactor, in Fig. 2, is illustrated as a single reactor 61, having a single magnetic circuit or core 62. One leg of the core 62 carries the windings 63 and 64, while the other leg carries the windings 65 and 66, all four of the windings having the same number of turns. The input-terminals of the windings 63, 64, 65 and 66 are connected, respectively, to the tube-group output-terminals 8A, 9B, 9A and 8B. The output-terminals of the windings 63 and 65 are connected to the output-circuit conductor 4, while the output-terminals of the windings 64 and 66 are connected to the output-circuit conductor 4'.

In the operation of the paralleling reactor 61 of Fig. 2, it will be noted that the ampere-turns of the positive half-waves of output-current, which are supplied by the output-terminal 8A of the positive-voltage tube-group A1, A3, A5, is normally cancelled by the ampere-turns of the negative half-waves of output-current supplied by the output-terminal 9B of the negative-voltage tube-group B4, B6, B2. Consequently, when there is no internal fault in the cycloconverter, so that the output-current in the conductor 4 is equal and opposite to the output-current in the conductor 4', no flux will be produced in the core-leg carrying the windings 63 and 64 of the paralleling reactor 61, and hence no reactance will be introduced in the output-circuit. However, in the case of an internal fault, resulting in a circulating-current flowing through the coils 63 and 65, for example, the ampere-turns of the coils 63 will not be cancelled by the ampere-turns of the closely coupled coil 64, and hence the reactance of the paralleling reactor 61 will be effective to limit the value of this short-circuit current.

In like manner, the reactor-coils 65 and 66, which are coupled on the other leg of the reactor 61 in Fig. 2, normally carry equal and opposite currents, as will be readily understood from the explanation already given.

Fig. 3 shows how the reactor 61 of Fig. 2 can be utilized in a simple single-phase circuit, in which the input-circuit is a single-phase circuit 1', 1', which is connected to a power-transformer 70 having a primary winding 71 and a secondary winding 72 having a midtap 73. The terminals of the secondary winding 72 are connected to a single-phase input-circuit 1", which is utilized to energize two positive-voltage tubes A1 and A1', and two negative-voltage tubes A4 and A4'. The positive-voltage tubes A1, A1' have a common cathode-circuit 8A which serves as a tube-group output-circuit which is connected to the reactor-coil 63; while the negative-voltage tubes A4, A4' have a common anode-circuit 9A' which serves as a tube-group output-terminal for energizing the reactor-coil 65. The output-terminals of these two reactor-coils 63 and 65, in Fig. 3, are connected to the output-circuit conductor 4. The return-circuit conductor 4' of the output-circuit in Fig. 3 is connected, through the reactor-coils 64 and 66, to the midtap 73 of the power-transformer winding 72.

The operation of the paralleling reactor 61, in Fig. 3, is essentially the same as has already been described in connection with Fig. 2, serving to interpose no reactance to currents drawn by the output-circuit 4, 4', but interposing any necessary amount of reactance to the flow of internal fault-currents in the cycloconverter.

While I have illustrated and explained my invention in its application to only three types of circuit-connection for the main anode-cathode circuits of the cycloconverter-tubes, as shown in Figs. 1, 2 and 3, and while I have illustrated and explained only a single preferred embodiment of control-circuits, as shown in Fig. 1, I wish it to be understood that my invention is not limited to the applications, or to the specific control-circuit, which I have chosen for illustration, nor am I limited to my explanation of my present understanding of the theory and operation of my invention. I desire, therefore, that the appended claims shall be accorded the broadest construction consistent with their language.

I claim as my invention:

1. An electronic frequency-changer comprising one or more pairs of positive and negative groups of tubes, each tube having a control-circuit, and having a main anode-and-cathode circuit; an alternating-current input-circuit associated with the tubes for interchanging input-frequency energy with the tubes; an alternating-current output-circuit conductor associated with a pair of groups for interchanging output-frequency energy therewith; the positive group of said pair of groups having a common cathode-circuit operating as an output-terminal for supplying the positive halves of the output-wave for said output-circuit conductor, the negative group of said pair of groups having a common anode-circuit operating as an output-terminal for supplying the negative halves of the output-wave for said output-circuit conductor; control-circuit excitation-means for exciting the control-circuits of the respective tubes, said control-circuit excitation-means including means for producing a control-voltage modulation at the output-frequency; and a paralleling reactor for interconnecting said tube-group output-terminals and said output-circuit conductor, said paralleling reactor comprising as many windings as there are output-circuit conductors, said windings being on a common magnetic circuit, and connections whereby each winding receives such proportion of the current-outputs of said tube-group output-terminals, including connections to all of the output-circuit conductors, that the total output-frequency flux in the magnetic circuit of the reactor is substantially zero under normal operating-conditions.

2. An electronic frequency-changer comprising a plurality of pairs of positive and negative groups of tubes, each tube having a control-circuit, and having a main anode-and-cathode circuit; an alternating-current input-circuit associated with the tubes for interchanging input-frequency energy with the tubes; a polyphase output-circuit associated with the several groups of tubes for interchanging output-frequency energy therewith; each positive group of tubes having a common cathode-circuit operating as an output-terminal for supplying the positive halves of the output-wave for one of the output-circuit phases, each negative group of tubes having a common anode-circuit operating as an output-terminal for supplying the negative halves of the output-wave for a corresponding output-circuit phase; control-circuit excitation-means for exciting the control-circuits of the respective tubes, said control-circuit excitation-means including means for producing a control-voltage modulation at the output-frequency; and means for providing, in effect, a plurality of paralleling reactors for interconnecting said tube-group output-terminals and the respective output-circuit phases, each paralleling reactor comprising a reactor-element having as many equal-turn windings as there are phases in the output-circuit, and a common magnetic circuit for said windings, and connections whereby each winding receives such proportion of the current-output of different tube-group output-terminals that the total output-frequency flux in the magnetic circuit of each reactor-element is substantially zero under normal operating-conditions.

3. An electronic frequency-changer comprising three pairs of positive and negative groups of tubes, each tube having a control-circuit, and having a main anode-and-cathode circuit; an alternating-current input-circuit associated with the tubes for interchanging input-frequency energy with the tubes; a three-phase alternating-current output-circuit associated with the several groups of tubes for interchanging output-frequency energy therewith; each positive group of tubes having a common cathode-circuit operating as an output-terminal for supplying the positive halves of the output-wave for one of the output-circuit phases, each negative group of tubes having a common anode-circuit operating as an output-terminal for supplying the negative halves of the output-wave for the corresponding output-circuit phase; control-circuit excitation-means for exciting the control-circuits of the respective tubes, said control-circuit excitation-means including means for producing a control-voltage modulation at the output-frequency; and means for providing, in effect, three paralleling reactors for interconnecting said tube-group output-terminals and the respective output-circuit phases, each paralleling reactor comprising a reactor-element having three equal-turn windings, said windings being on a common magnetic circuit, and connections whereby one of the windings of each reactor-element is connected between one of the output-circuit phase-conductors and an output-terminal of one group of the corresponding pair of groups, and connections whereby the other two windings of each reactor-element are respectively connected between the other two output-circuit phase-conductors and output-terminals of the respective corresponding pairs of groups, the second-mentioned connections being to output-terminals of a polarity opposite to the polarity of the output-terminals associated with the first-mentioned connections.

4. An electronic frequency-changer comprising one or more pairs of positive and negative groups of tubes, each tube having a control-circuit, and having a main anode-and-cathode circuit; an alternating-current input-circuit associated with the tubes for interchanging input-frequency energy with the tubes; an alternating-current output-circuit conductor associated with a pair of groups for interchanging output-frequency energy therewith; the positive group of said pair of groups having a common cathode-circuit operating as an output-terminal for supplying the positive halves of the output-wave for said output-circuit conductor, the negative group of said pair of groups having a common anode-circuit operating as an output-terminal for supplying the negative halves of the output-wave for said output-circuit conductor; control-circuit excitation-means for exciting the control-circuits of the respective tubes, said control-circuit excitation-means including means for producing a control-voltage modulation at the input-frequency, and means for producing a control-voltage modulation at the output-frequency; and a paralleling reactor for interconnecting said tube-group output-terminals and said output-circuit conductor, said paralleling reactor comprising as many windings as there are output-circuit conductors, said windings being on a common magnetic circuit, and connections whereby each winding receives such proportion of the current-outputs of said tube-group output-terminals, including connections to all of the output-circuit conductors, that the total output-frequency flux in the magnetic circuit of the reactor is substantially zero under normal operating-conditions.

5. An electronic frequency-changer comprising a plurality of pairs of positive and negative groups of tubes, each tube having a control-circuit, and having a main anode-and-cathode circuit; an alternating-current input-circuit associated with the tubes for interchanging input-frequency energy with the tubes; a polyphase output-circuit associated with the several groups of tubes for interchanging output-frequency energy therewith; each positive group of tubes having a common cathode-circuit operating as an output-terminal for supplying the positive halves of the output-wave for one of the output-circuit phases, each negative group of tubes having a common anode-circuit operating as an output-terminal for supplying the negative halves of the output-wave for a corresponding output-circuit phase; control-circuit excitation-means for exciting the control-circuits of the respective tubes, said control-circuit excitation-means including means for producing a control-voltage modulation at the input-frequency, and means for producing a control-voltage modulation at the output-frequency; and means for providing, in effect, a plurality of paralleling reactors for interconnecting said tube-group output-terminals and the respective output-circuit phases, each paralleling reactor comprising a reactor-element having as many equal-turn windings as there are phases in the output-circuit, and a common magnetic circuit for said windings, and connections whereby each winding receives such proportion of the current-output of different tube-group output-terminals that the total output-frequency flux in the magnetic circuit of each reactor-element is substantially zero under normal operating-conditions.

6. An electronic frequency-changer comprising three pairs of positive and negative groups of tubes, each tube having a control-circuit, and having a main anode-and-cathode circuit; an alternating-current input-circuit associated with the tubes for interchanging input-frequency energy with the tubes; a three-phase alternating-current output-circuit associated with the several groups of tubes for interchanging output-frequency energy therewith; each positive group of tubes having a common cathode-circuit operating as an output-terminal for supplying the positive halves of the output-wave for one of the output-circuit phases, each negative group of tubes having a common anode-circuit operating as an output-terminal for supplying the negative halves of the output-wave for the corresponding output-circuit phase; control-circuit excitation-means for exciting the control-circuits of the respective tubes, said control-circuit excitation-means including means for producing a control-voltage modulation at the input-frequency, and means for providing a control-voltage modulation at the output-frequency; and means for providing, in effect, three paralleling reactors for interconnecting said tube-group output-terminals and the respective output-circuit phases, each paralleling reactor comprising a reactor-element having three equal-turn windings, said windings being on a common magnetic circuit, and connections whereby one of the windings of each reactor-element is connected between one of the output-circuit phase-conductors and an output-terminal of one group of the corresponding pair of groups, and connections whereby the other two windings of each reactor-element are respectively connected between the other two output-circuit phase-conductors and output-terminals of the respective corresponding pairs of groups, the second-mentioned connections being to output-terminals of a polarity opposite to the polarity of the output-terminals associated with the first-mentioned connections.

7. The invention as defined in claim 4, characterized by said control-circuit excitation-means including input-frequency control-voltages so phased as to initiate both the rectifier-operation and the inverter-operation of each tube of the frequency-changer, provided that such initiation is not blocked by the output-frequency control-voltage modulation, and provided that the tube has an anode-voltage which is more positive than its cathode-voltage at the moment, whereby each group of tubes is, in general, capable of supplying a complete positive or negative half of the output-voltage wave, as the case may be, regardless of the output-circuit power factor.

8. The invention as defined in claim 5, characterized by said control-circuit excitation-means including input-frequency control-voltages so phased as to initiate both the rectifier-operation and the inverter-operation of each tube of the frequency-changer, provided that such initiation is not blocked by the output-frequency control-voltage modulation, and provided that the tube has an anode-voltage which is more positive than its cathode-voltage at the moment, whereby each group of tubes, is, in general, capable of supplying a complete positive or negative half of the output-voltage wave, as the case may be, regardless of the output-circuit power factor.

9. The invention as defined in claim 6, characterized by said control-circuit excitation-means including input-frequency control-voltages so phased as to initiate both the rectifier-operation and the inverter-operation of each tube of the frequency-changer, provided that such initiation is not blocked by the output-frequency control-voltage modulation, and provided that the tube has an anode-voltage which is more positive than its cathode-voltage at the moment, whereby each group of tubes is, in general, capable of supplying a complete positive or negative half of the output-voltage wave, as the case may be, regardless of the output-circuit power factor.

JOHN L. BOYER.